(12) United States Patent
Hirsh et al.

(10) Patent No.: US 11,837,863 B2
(45) Date of Patent: Dec. 5, 2023

(54) APPARATUS AND METHOD FOR MONITORING A CIRCUIT UNDER LOAD USING A CIRCUIT BREAKER

(71) Applicant: SMARTKABLE LLC, Skaneateles, NY (US)

(72) Inventors: Douglas S. Hirsh, Skaneateles, NY (US); Radovan Hrinda, Clark, NJ (US)

(73) Assignee: SMARTKABLE LLC, Skaneateles, NY (US)

( * ) Notice: Subject to any disclaimer, the term of this patent is extended or adjusted under 35 U.S.C. 154(b) by 47 days.

(21) Appl. No.: 17/421,060

(22) PCT Filed: Jan. 6, 2020

(86) PCT No.: PCT/US2020/012312
§ 371 (c)(1),
(2) Date: Jul. 7, 2021

(87) PCT Pub. No.: WO2020/146227
PCT Pub. Date: Jul. 16, 2020

(65) Prior Publication Data
US 2022/0102958 A1 Mar. 31, 2022

Related U.S. Application Data (60) Provisional application No. 62/789,055, filed on Jan. 7, 2019.

(51) Int. Cl.
*H02H 3/00* (2006.01)
*H02H 3/04* (2006.01)
(Continued)

(52) U.S. Cl.
CPC ............ *H02H 3/04* (2013.01); *H02H 1/0092* (2013.01); *H02H 3/021* (2013.01); *G08B 7/06* (2013.01)

(58) Field of Classification Search
None
See application file for complete search history.

(56) References Cited

U.S. PATENT DOCUMENTS

| | | |
|---|---|---|
| 2,657,354 A | 10/1953 | Van Sickle |
| 4,634,981 A | 1/1987 | Shimp et al. |

(Continued)

FOREIGN PATENT DOCUMENTS

| | | |
|---|---|---|
| JP | 2004-144485 | 5/2004 |
| JP | 2005-117750 | 4/2005 |
| WO | 2018/094006 | 5/2018 |

*Primary Examiner* — Stephen W Jackson
(74) *Attorney, Agent, or Firm* — Clark & Brody LP (57) ABSTRACT

A method and apparatus provide an improved way to monitor a circuit for deterioration and obtain an advance warning of the deterioration so that action can be taken before the circuit breaker may trip for the circuit. The method establishes a baseline for the circuit, including monitoring the zero crossing point for the voltage and current for the circuit. In operation, the circuit is monitored using the zero crossing point and this information is compared to the baseline to determine if a change has occurred. The baseline information establishes thresholds that signify that the circuit is deteriorating so that the appropriate signal can be provided so that an appropriate action can be taken, interrupt the circuit, take remedial action, etc.

12 Claims, 6 Drawing Sheets

(51) Int. Cl.
  *H02H 1/00* (2006.01)
  *H02H 3/02* (2006.01)
  *G08B 7/06* (2006.01)

(56) References Cited

U.S. PATENT DOCUMENTS

| | | | | |
|---|---|---|---|---|
| 5,796,631 | A | * 8/1998 | Iancu | G01R 19/2513 |
| | | | | 323/215 |
| 6,249,137 | B1 | * 6/2001 | Krieger | G01R 31/2839 |
| | | | | 324/762.02 |
| 2001/0043124 | A1 | * 11/2001 | Hilliard | G01D 5/2013 |
| | | | | 324/207.16 |
| 2013/0063205 | A1 | 3/2013 | Ohnari et al. | |
| 2013/0329331 | A1 | 12/2013 | Erger et al. | |
| 2014/0239972 | A1 | 8/2014 | Hirsh et al. | |
| 2017/0038421 | A1 | 2/2017 | Hirsh et al. | |
| 2020/0059225 | A1 | * 2/2020 | Hirsh | G05B 23/0283 |

* cited by examiner

APPARATUS AND METHOD FOR MONITORING A CIRCUIT UNDER LOAD USING A CIRCUIT BREAKER

FIELD OF THE INVENTION

An apparatus and method for monitoring a circuit under load using a circuit breaker is provided that uses the return neutral side of the circuit to permit a more accurate and precise monitoring of voltage, current, capacitance, and impedance across the circuit.

BACKGROUND ART

Historically, power distribution circuit breakers have been around for years, with the most recent variety having the ability for ground fault interruption. These traditional means for breaking a circuit are based on the line side of the circuit drawing excessive current (above rated capacity) and "tripping" or de-energizing the circuit until reset, which is usually manually. Recent equipment advances have incorporated various communication techniques using a local network so that reset can be done in other ways than a manual reset of the breaker.

Figure 1:
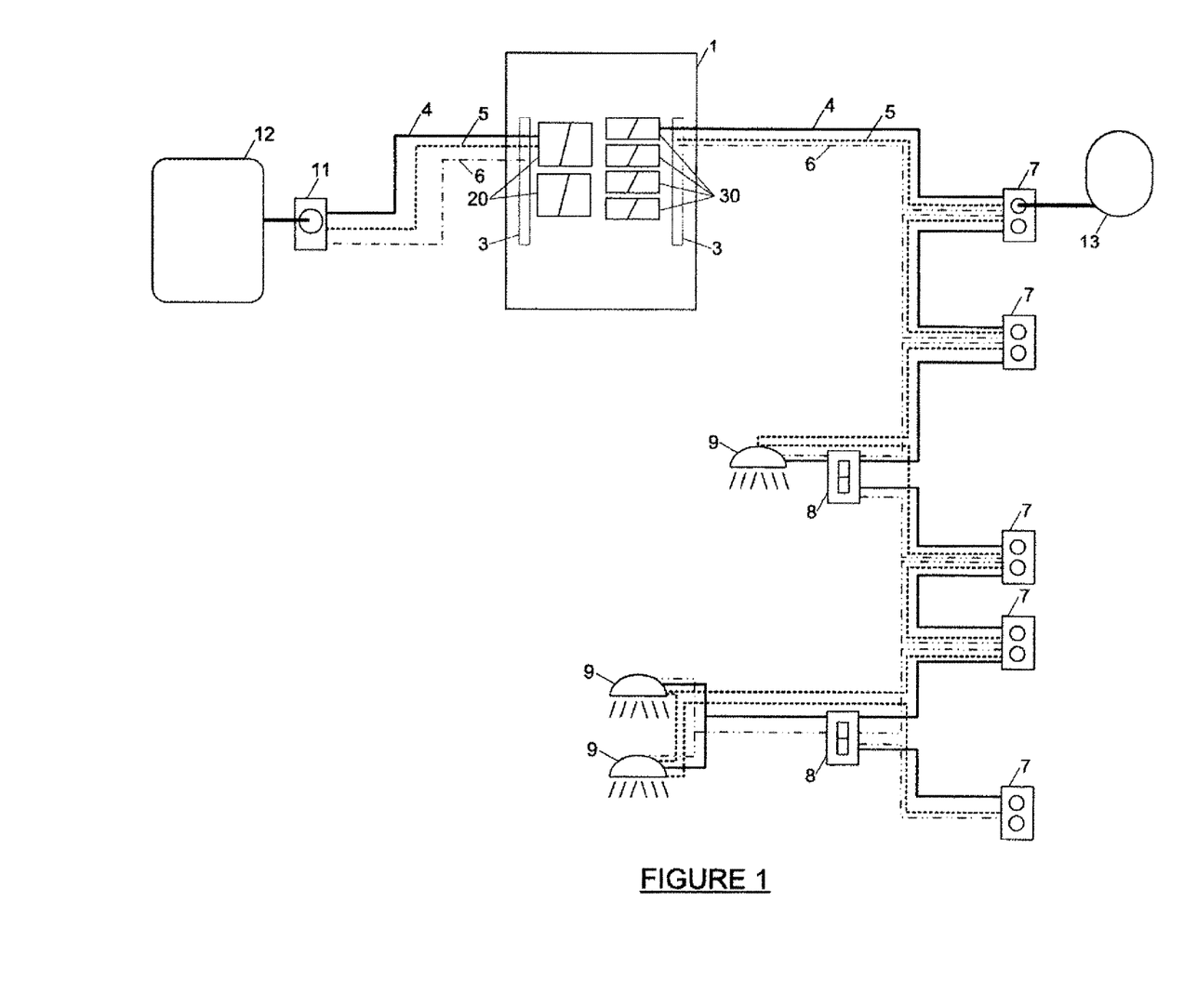
FIG. 1 is a diagram of a conventional power distribution center.

FIG. 1 is a typical power distribution center 1 provides single phase 115/230V power to a network of wires to outlets, lights, and appliances. Each of the 115V networks has a load breaker 2, while the 230V network has a double pole breaker 10 to provide an intervention method should over current conditions occur on the load wire 4, while the return wire 5 and ground wire 6 complete the circuit back to the ground bar 3 for electricity to flow to the network. A 115V network might consist of outlets 7, lights 9 though switches 8, and loads 13. A 230V network uses both the load 4 and the return 5 wires to provide power with the ground 6 completing the circuit. These style trip breakers have been around for many years and provide intervention for the instantaneous excess of current drawn by the circuit. In the 1960's a ground fault interrupt circuit breaker was developed and matured into a breaker, which are typically used in wet locations. These style breakers also provide a method to intervene only when an excessive current is drawn on a circuit.

Electrical fires in the power distribution networks for residents' costs over $2 billion dollars in damage, and nearly 2700 lives lost, while in non-residence buildings a total of 1550 injuries and another $2 billion was lost in damage due to fires.

Traditional circuit breaker, smoke detectors, and ground fault interrupt circuits, although providing improvement in safety cannot further reduce these occurrences.

As such, a need exists for improvements in the prior art circuit breakers that only rely on excessive current draws before the breakers trip.

SUMMARY OF THE INVENTION

The invention uses for conditions which are much more sensitive to the electrical characteristics that exist in a given distribution network, but will include the loads associated with the particular circuit.

The invention has the ability to measure the source electrical characteristics, but unlike the traditional breaker, uses the return neutral side of the circuit. This is important to accurately and precisely monitoring the voltage, current, capacitance, and the impedance across the circuit and loads. Small atypical changes in these electrical characteristics indicate a potential for fire. The electrical characteristics, which can only be measured by monitoring both source and return, are processed through an algorithm to plot performance curves. The invention is an artificial intelligence device, learning from historic circuit performance which allows for clearly identifying operational limits well below the rated current draw of a typical distribution breaker and predicting the potential for fire, well before the heat associated with an over current condition exists. An audible alarm, communication to various other sources, and/or lastly intervening in the circuit will alert the user of the potential for fire based upon the preset limits of the algorithm curve.

The invention can be deployed in various arrangements, which may be an integrated breaker with a transmitter, remote transmitting control unit incorporated to breakers, or a remote control unit integrated to a main bus bar; but is not limited to these configurations. The invention maybe deployed on main disconnects, relays, or switching units as well and the invention is not limited by voltage or current limits.

More particularly, a method for monitoring a circuit under load using a circuit breaker is provided that establishes a baseline over time for the circuit based on angular displacements in a sine curve based on voltage and current for the circuit in a vicinity of a zero crossing point of the sine curve, and a power factor, impedance, capacitance, and inductive reactance, the baseline based on a period at the time of monitoring and the period at a start time. The method repeatedly monitors a functioning in-service circuit over a period of time in the vicinity of the zero crossing point for a sine curve of the in-service circuit using the angular displacements, power factor, impedance, capacitance, and inductive reactance used in baseline determination for the load of the in-service circuit. The baseline is compared to information from the monitoring step to determine a degradation for the functioning in-service circuit and a decay curve, the decay curve providing an indication of a deterioration of the circuit, the decay curve providing a guide for generating an alarm and/or rendering the circuit inoperable.

The method can provide an audible alarm and/or a visual display when a deterioration is noticed in the circuit that requires action. The alarm can be a communication, using either wireless or hard-wired transmission. Once the deterioration of the circuit is determined, the circuit can be made inoperable based on the deterioration.

The invention also includes an apparatus for practicing the monitoring method. The apparatus includes a circuit breaker for monitoring a load on an electrical circuit and a control module spliced into the electrical circuit. The control module is equipped with the baseline information and configured for the monitoring of the circuit load and comparing the monitored conditions to the baseline for determining a deterioration in the electrical circuit.

The apparatus can include an alarm capability when deterioration in the electrical circuit is determined. The alarm capability can be one or more of an audible alarm, a visual display, and a communication, either wireless transmission or hard wire transmission.

The control module can also be configured to trip the circuit breaker based on a determination of deterioration of the electrical circuit.

DETAILED DESCRIPTION OF THE INVENTION

The invention is designed to typically function in a power distribution center that employs circuit breakers such as the distribution center shown in FIG. 1. In these prior art distribution systems, there are no known methods or devices that allow monitoring and intervening in the circuit when the electrical circuit has deteriorated over time, this deterioration not yet exceeding the typical current rating of the breaker, and then interceding in the circuit power. Most electrical fires occur because of the abating of the circuit or loads over time.

The invention is a predictive method and apparatus that monitors the deterioration of the circuit and loads for fire conditions. The invention will monitor the current, voltage, impedance, capacitance and phase relationship of the circuit and loads by measuring at the load wire 4, and the return wire 5 for 115V circuits, see FIG. 2, and measuring at the load wire 4, the return wire 5, and the ground wire 6 for 230V circuits, see FIG. 3. The return wire 5 for 115V or the ground wire 6 for 230V, will be connected through a wire splice 21 which is fed back to the breaker 20, FIG. 2, or breaker 30, FIG. 3, via wire 22. This method of circuit monitoring can be applied to any voltage/current rated electrical path.

Figure 3:
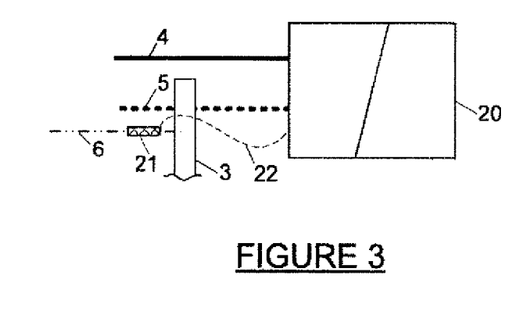
FIG. 3 is a schematic drawing of a second embodiment of the inventive circuit breaker.
Figure 4:
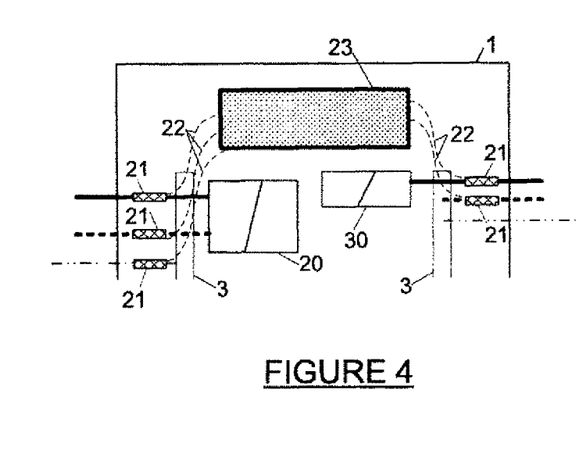
FIG. 4 is a schematic drawing showing the control module of the invention interfaced with two kinds of breakers.

An additional aspect of the inventive method and apparatus is shown in the FIG. 4. FIG. 4 shows the combination of the breakers 20 and 30 of FIG. 1, splices 21 and wires 22 of FIGS. 2 and 3 and a control module 23, all arranged in a housing 1. With the control module 23 and the breakers 20 or 30, the apparatus has the ability to alert a user, alarm a home monitoring system, transmit messages to the user via the control module 23, as well as interrupt the circuit like a traditional "trip" breaker.

Figure 2:
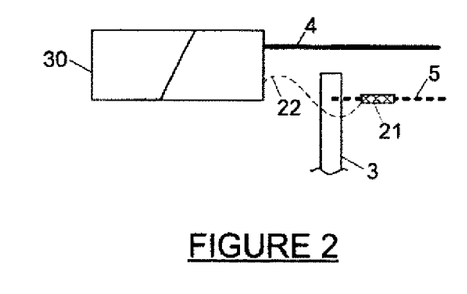
FIG. 2 is a schematic drawing of a first embodiment of the inventive circuit breaker.

Although not depicted in FIGS. 2 and 3, the control module 23 would be connected to the wires 22 for the breaker 20 and the wires 22 for the breaker 30.

Historical data for the circuit is stored within the control module (23) for analysis to determine potential for fire conditions. This artificial intelligence method of data collection and analysis allows the invention to determine the condition of the circuit and loads.

Figure 5:
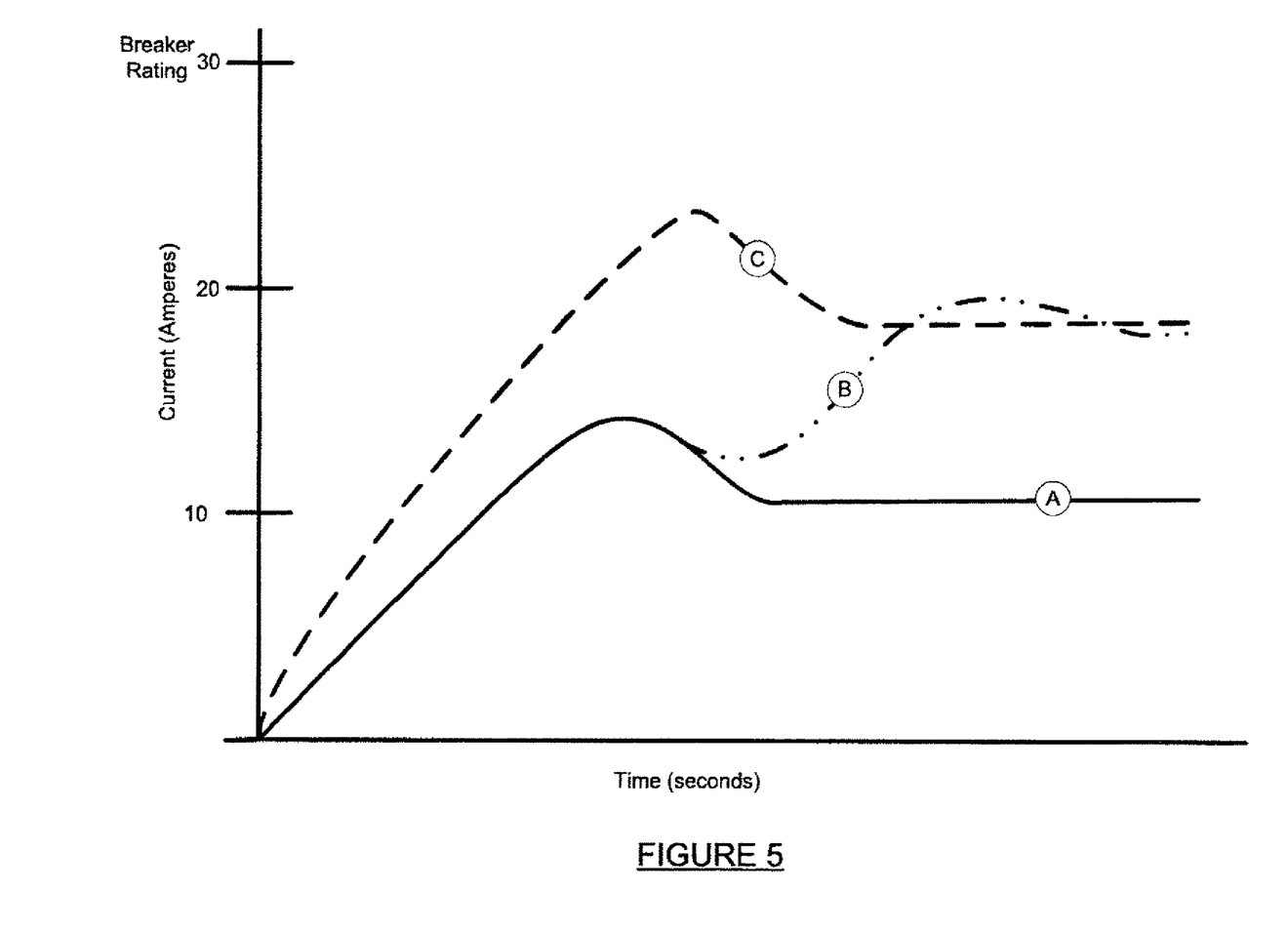
FIG. 5 is curves of current versus time for different conditions for a typical 20 amp breaker.

FIG. 5 shows a typical current curve (A) when a load is applied to the circuit, while curve (C) might express the limit established by a typical breaker. For a 20 AMP "trip" breaker, the condition exhibited by curve (C) could provide intervention of the circuit under load; however, this deterioration between curve (A) and curve (C) typically occurs over an extended period of time. A secondary condition may exist with curve (B) as the load current draw may occur after the initial period and would not typically activate the 20 AMP "trip" breaker. This condition is typical to a circuit that has the potential for a fire hazard as the elements of the circuit or load are breaking down, increasing resistance and heating the components.

Figure 6:
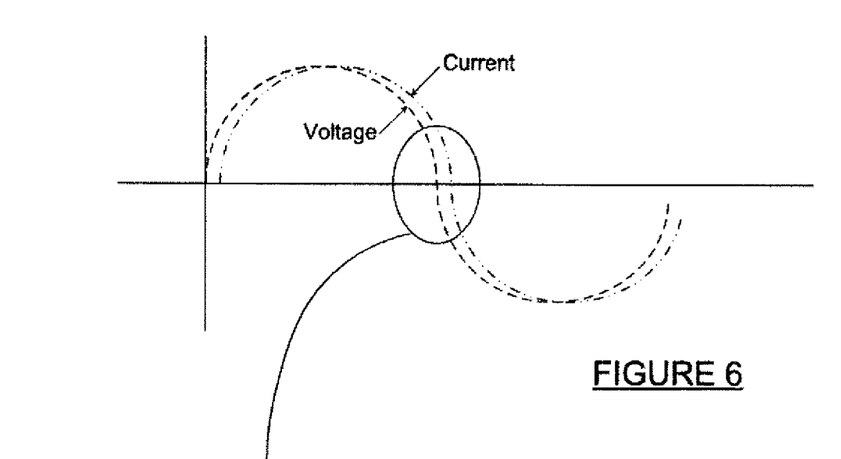
FIG. 6 shows zero crossing point curves for current and voltage.

In the case of determining power loss and host integrity, the concern is not merely with the total voltage or current drawn by a circuit, but rather the zero crossing point of the voltage and current signal. This gives critical zero crossing points, as depicted in FIG. 6. The essential characteristic of the zero crossing points establishes a baseline reference to a position curve to compare future analysis towards establishing a usage curve, while the baseline of the previously examinations is utilized to establish fire potential investigation associated with yet another curve and this is further explained in connection with FIGS. 7A-8 below.

The current measurement of the circuit is straight forward, and is typically associated with circuit integrity as a measurement of total amperage, but quantifying this characteristic is not, as the current change is an effect of the symptoms of increased resistance associated with fire potential. The method and apparatus focus on the zero crossing point to determine phase to phase relationship between the current and voltage signals. This relationship then is used to calculate the impedance, capacitance, inductive reactance, and power factor of the host circuit.

Figure 7A:
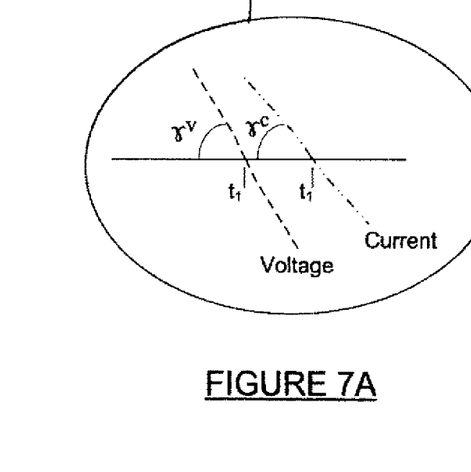
FIG. 7A shows crossing points curves for current and voltage under normal conditions.
Figure 7B:
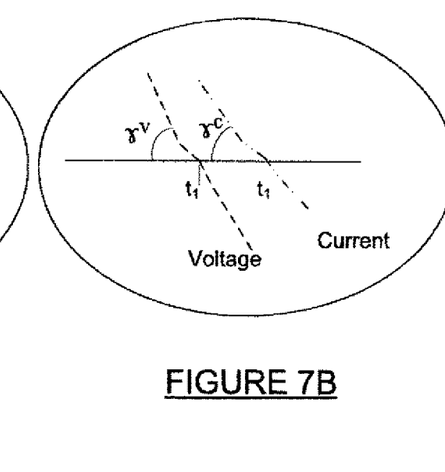
FIG. 7B shows crossing point curves for current and voltage indicating a change in the current and voltage curve shape from FIG. 7A after a certain time period.
Figure 7C:
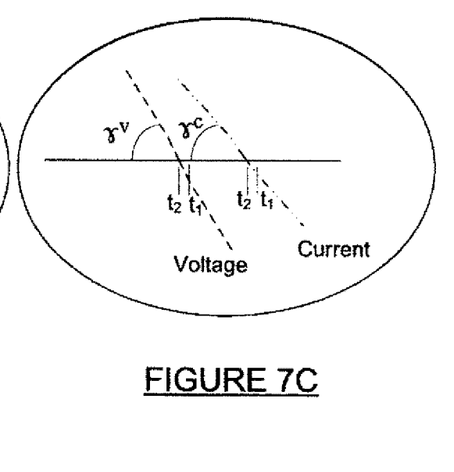
FIG. 7C shows additional crossing point curves similar to those of FIG. 7A after an elapsed time period.

One of the most important attributes of each the voltage and current curves, occurs at the zero crossing point. The change of angle at the zero crossing point is the first indicator of a signal change; the signal will begin to "walk". The phenomenon cannot be measured with traditional breakers on circuits, but this early indicator is required to determine the health of the circuit, and project the potential for upcoming fire conditions. FIG. 7A shows the angle of the zero crossing point under normal conditions, at some point $t_1$. While FIG. 7B designates the initial change of the current ($\Upsilon^c$) and voltage ($\Upsilon^c$) curves angles indicating a serious transformation is occurring and FIG. 7C shows these curves have walked, at time $t_2$, to a new position with near zero crossing curve angles identical to original time $t_1$.

The impedance, capacitance, and inductive reactance, are considered when the zero crossing point angle of intersection of the current ($\Upsilon^c$) and voltage ($\Upsilon^c$) curves indicates a change in angle. These must be measured and analyzed at this critical moment because the utility will compensate the electrical power to the increased load nearly instantaneous. A typical algorithm would consider each of these characteristics, between time $t_1$ and time $t_2$; and might be written as follows.

$$\text{Algorithm Output} = \{\text{Voltage}_2 * [\text{sine}((\Upsilon^c{}_{v1}) - (\Upsilon^c{}_{v2})] + \text{Current}_2 * [\sin((\Upsilon^c{}_{c1}) - (\Upsilon^c{}_{c2})]\} * (\text{PowerFactor}_2 + \text{Impedence}_2 + \text{InductiveReactance}_2 + \text{Capacitance}_2)$$

Power Factor is the phase difference between the current and voltage curves; when the curves match perfectly the power factor would be one (1), while any deviation from a perfect match would be given as 0.95 for example or 95% efficiency.

If nothing has changed between time $t_1$ and time $t_2$, then the output would be zero, but over a historical period this will change. The control module 23 has the ability to self-regulate time intervals such that as the algorithm changes with successive readings, the time interval will automatically decrease to insure intervention of the circuit. This transpires well in advance of an overload condition traditional breakers intercede.

Figure 8:
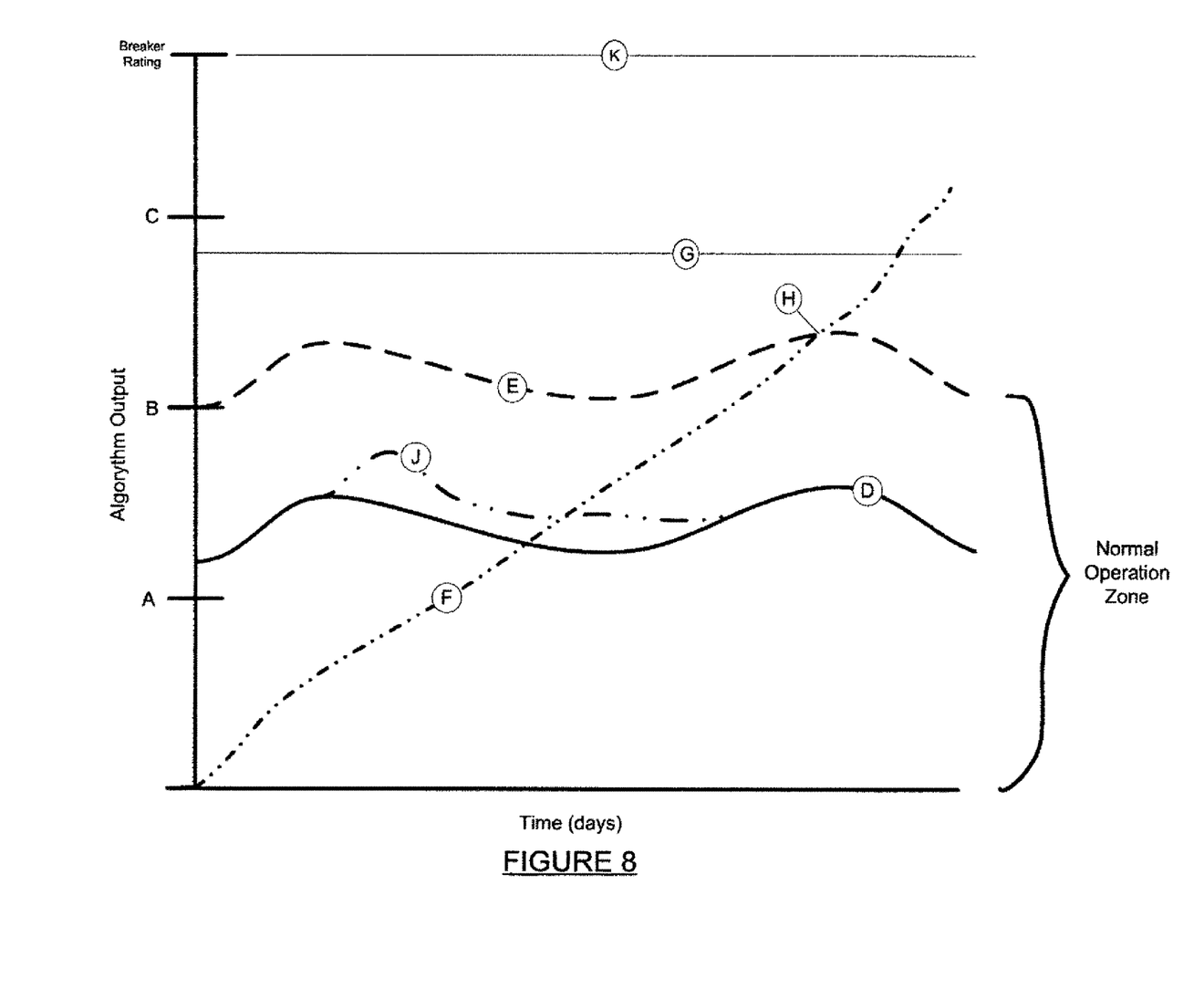
FIG. 8 shows curves relating an algorithm output with respect to time for different conditions for a breaker.

FIG. 8 shows the output of an algorithm that incorporates the combined electrical characteristic monitored by the invention which allows for early involvement in fire prediction, with reference to historical normal operational characteristics of the host circuit. With the storage and interpretation of historical data, a typical usage and baseline curve (D) is established. This curve is generated by past performance of specific circuit under typical load conditions over a set period of operation. This data is kept as a baseline for all future loads within this circuit. Should a significant change occur, this change is compared to baseline, and if continuous then logged as new baseline, as long as it will exceed point H. Continual change along curve F is plotted, which allows for device to intervene before operational parameters exceed point H. A new initial load may show as in curve (J) but this does not violate the upper control limit curve (E). Curve E tracks Curve D but is increased by a given percentage, e.g., 15%. This percentage increase can range from 10 to 20%.

Curve (F) would show an actual circuit with loads that are deteriorating over time and could ultimately lead to a fire condition at point (H). Curve F is generated using the algorithm described above based on the conditions being monitored. The system can now provide an alert when the decay curve (F) exceeds the limit curve (E), which would be well before a fire will occur, i.e., point (H). Of course, if action is not taken once decay curve exceeds or equals the control limit, the artificial intelligence apparatus itself can intervene and de-energize the circuit. The "trip" point for the inventive breaker is shown as Line (G), which is well below the traditional "trip" breaker point depicted as Line (K). What the invention does is provide an early intervention at the (H) point so that action can be taken, if so desired. A second intervention can occur if Curve F reaches Curve G, e.g., the breaker is tripped before the breaker rating is reached. These early interventions provide the ability to monitor a circuit and its loads for predicting potential conditions that cause fires.

The control module 23 is the analytic instrument that provides feedback to the consumer or other entity whose would be concerned with the operation of the circuit breaker. Control module 23 stores Curve (D), and Curve (E), and generates curve (F) based on the actual circuit operation. This module can provide an audible alarm to user for alert at the point of use, e.g., point H, as well as be integrated via wireless technology to existing home security monitoring equipment for alerts to a consumer through their network; including text messaging alerts, service organization alerts, or emergency services alerts. Should the control module continue to observe circuit characteristics predicting fire potential, alarms are issued in the same manner. Ultimately, should the circuit reach critical limits as depicted at curve (G) in FIG. 6, the control module 23 would "trip" breaker 20 or 30 to disrupt the electrical circuit until the consumer resolves fire potential. This tripping falling well below the limit of the breaker 20 or 30 as shown as Curve (K) of FIG. 8. The control module 23 has the ability to store data for historical analysis to support troubleshooting of the circuit.

The invention entails a method for monitoring the condition of a circuit with loads to determine potential for fire hazards comprising:

a) determining a baseline for voltage, current, impedance, and capacitance of the circuit with loads using historical data for the circuit to establish parameters for circuit operation under load;

b) establishing a control limit for the circuit under load during startup and operation based on the baseline;

c) monitoring the circuit based on the voltage, current, impedance, and capacitance and comparing results of the monitoring step to the control limit, and providing an alarm if the results of the monitoring step exceed or equal the control limit.

The electrical parameters establish an algorithm to indicate normal operations. The electrical parameters establish an algorithm to indicate upper control limits for fire hazard potential.

The method would provide analysis such that a deteriorating condition could exist that would violate upper control limits and have potential for fire. The criterial of fire potential being analyzed—an audible or messaging system would alert the user. In addition or alternatively, a transmitted signal can be provided to a home alert system.

Exceeding the threshold of invention, the circuit under load can be broken to prevent potential fire hazard.

An apparatus is also provided for practicing the inventive method. The apparatus includes a circuit breaker with capabilities to monitor electrical characteristics for analysis and a splice with capabilities to forward measured electrical characteristics to control module for analysis. A control module is provided with data storage and analysis capabilities to determine an operational state of circuit with load being monitored.

The apparatus also has the ability to use the control module to alert, or alarm through a variety of resources and to intervene in operations of circuit under load.

As such, an invention has been disclosed in terms of preferred embodiments thereof which fulfills each and every one of the objects of the present invention as set forth above and provides a new and improved method and apparatus for monitoring circuit deterioration before a circuit breaker would trip.

Of course, various changes, modifications, and alterations from the teachings of the present invention may be contemplated by those skilled in the art without departing from the intended spirit and scope thereof. It is intended that the present invention only be limited by the terms of the appended claim.

The invention claimed is:

1. A method for monitoring a circuit under load using a circuit breaker comprising:

a) establishing a baseline over time for the circuit based on angular displacements in a sine curve based on voltage and current for the circuit in a vicinity of a zero crossing point of the sine curve, and a power factor, impedance, capacitance, and inductive reactance, the baseline based on a period at the time of monitoring and the period at a start time;

b) repeatedly monitoring a functioning in-service circuit over a period of time in the vicinity of the zero crossing point for a sine curve of the in-service circuit using the angular displacements, power factor, impedance, capacitance, and inductive reactance used in step (a) for the load of the in-service circuit; and c) comparing the baseline of step (a) to information from step (b) to determine a degradation for the functioning in-service circuit and a decay curve, the decay curve providing an indication of a deterioration of the circuit, the decay curve providing a guide for generating an alarm and/or rendering the functioning in-service circuit inoperable.

2. The method of claim 1, wherein the alarm is an audible alarm and/or a visual display.

3. A method for monitoring a circuit under load using a circuit breaker comprising:
   a) establishing a baseline over time for the circuit based on angular displacements in a sine curve based on voltage and current for the circuit in a vicinity of a zero crossing point of the sine curve, and a power factor, impedance, capacitance, and inductive reactance, the baseline based on a period at the time of monitoring and the period at a start times;
   b) repeatedly monitoring a functioning in-service circuit over a period of time in the vicinity of the zero crossing point for a sine curve of the in-service circuit using the angular displacements, power factor, impedance, capacitance, and inductive reactance used in step (a) for the load of the in-service circuit; and
   c) comparing the baseline of step (a) to information from step (b) to determine a degradation for the functioning in-service circuit and a decay curve, the decay curve providing an indication of a deterioration of the circuit, the decay curve providing a guide for generating an alarm and/or rendering the functioning in-service circuit inoperable,
   the method of claim 1, wherein the alarm is a communication, either wireless or hard wired.

4. The method of claim 1, wherein the functioning in-service circuit is made inoperable based on the deterioration.

5. An apparatus for practicing a method for monitoring a circuit under load using a circuit breaker, the method comprising:
   a) establishing a baseline over time for the circuit based on angular displacements in a sine curve based on voltage and current for the circuit in a vicinity of a zero crossing point of the sine curve, and a power factor, impedance, capacitance, and inductive reactance, the baseline based on a period at the time of monitoring and the period at a start time;
   b) repeatedly monitoring a functioning in-service circuit over a period of time in the vicinity of the zero crossing point for a sine curve of the in-service circuit using the angular displacements, power factor, impedance, capacitance, and inductive reactance used in step (a) for the load of the in-service circuit; and
   c) comparing the baseline of step (a) to information from step (b) to determine a degradation for the functioning in-service circuit and a decay curve, the decay curve providing an indication of a deterioration of the circuit, the decay curve providing a guide for generating an alarm and/or rendering the functioning in-service circuit inoperable,
   the apparatus comprising
   a) a circuit breaker for monitoring the load on the functioning in-service circuit,
   b) a control module spliced into the electrical circuit, the control module including the baseline and configured for the monitoring and comparing steps (b) and (c) for determining a deterioration in the functioning in-service circuit.

6. The apparatus of claim 5, including an alarm capability when deterioration in the functioning in-service circuit is determined, the alarm capability including one or more of an audible alarm, a visual display, and a communication, either wirelessly transmitted or hard wire transmitted.

7. The apparatus of claim 5, wherein the control module is configured to trip the circuit breaker based on a determination of deterioration of the functioning in-service circuit.

8. The method of claim 3, wherein the functioning in-service circuit is made inoperable based on the deterioration.

9. The method of claim 3, wherein the alarm is an audible alarm and/or a visual display.

10. An apparatus for practicing the method of claim 3, comprising
    a) a circuit breaker for monitoring the load on the in-service circuit,
    b) a control module spliced into the functioning in-service circuit, the control module including the baseline and configured for the monitoring and comparing steps (b) and (c) for determining a deterioration in the functioning in-service circuit.

11. The apparatus of claim 10, including an alarm capability when deterioration in the functioning in-service circuit is determined, the alarm capability including one or more of an audible alarm, a visual display, and a communication, either wirelessly transmitted or hard wire transmitted.

12. The apparatus of claim 10, wherein the control module is configured to trip the circuit breaker based on a determination of deterioration of the functioning in-service circuit.

* * * * *